(No Model.)
P. D. PIKE.
VENTILATION OF SOIL AND WASTE PIPES.
No. 310,079. Patented Dec. 30, 1884.
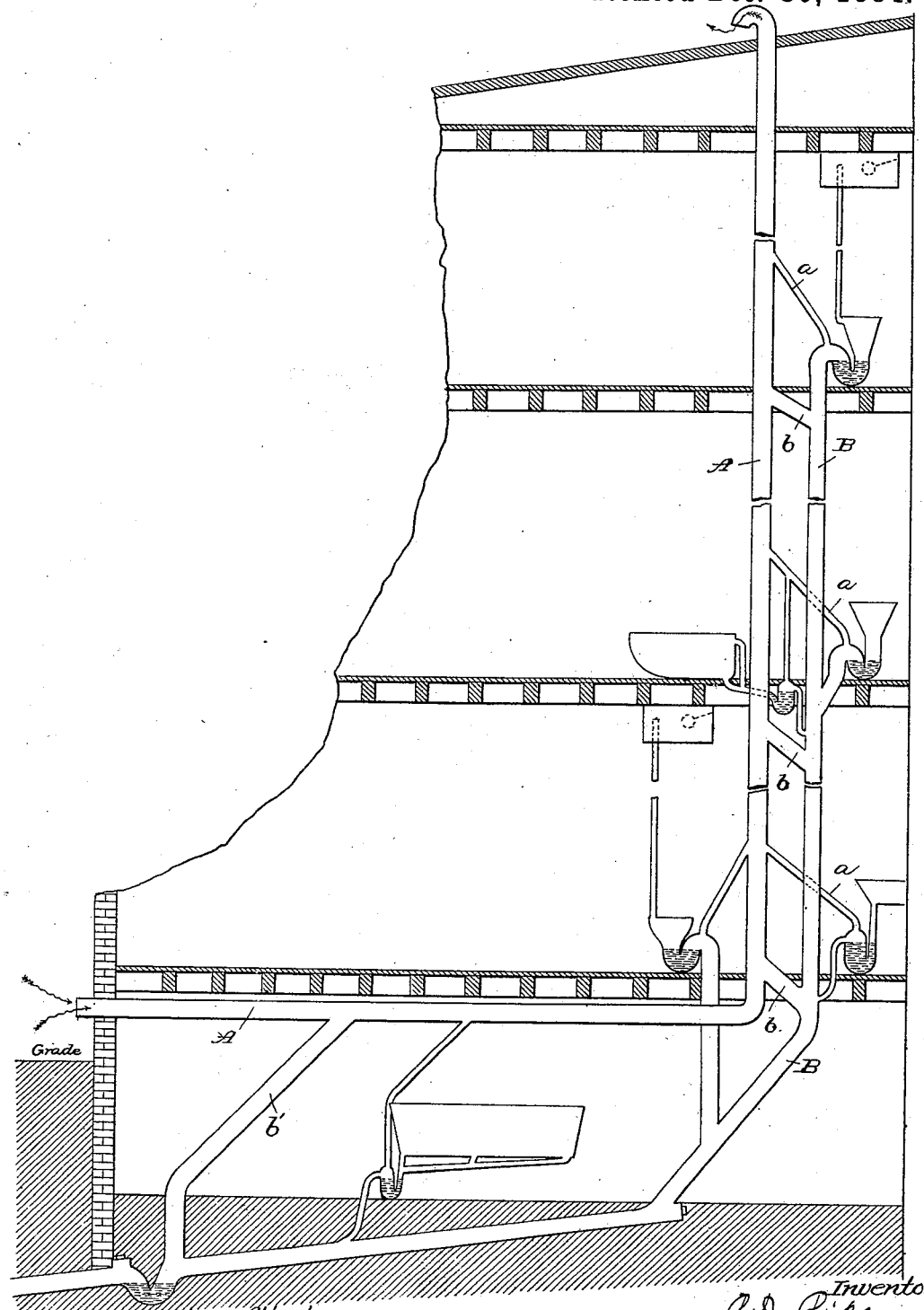

UNITED STATES PATENT OFFICE.

PAPHRO D. PIKE, OF WORCESTER, MASSACHUSETTS.

VENTILATION OF SOIL AND WASTE PIPES.

SPECIFICATION forming part of Letters Patent No. 310,079, dated December 30, 1884.

Application filed April 3, 1884. (No model.)

*To all whom it may concern:*

Be it known that I, PAPHRO D. PIKE, of Worcester, in the county of Worcester and Commonwealth of Massachusetts, have invented a new and useful Improvement in the Ventilation of Soil and Waste Pipes, &c.; and I do hereby declare that the following is a full, clear, and exact description of the same.

My invention has for its object the ventilation of soil-pipes and their house-connections, and the prevention of siphoning in the traps of the basins, tubs, and water-closet bowls of houses.

The accompanying drawing represents a section of a house with the soil and ventilating pipes, the tubs, bowls, basins, and the traps and connections in side elevation.

In the drawing, A represents the ventilating-pipe, the lower end of which is open to the air above the grade, while the upper end extends through the roof. The soil-pipe B extends from the sewer upward parallel with and near to the ventilating-pipe A, and is connected with the traps of the various receptacles, as shown.

Heretofore pipe-connections have been made between the upper bend or discharge of the trap and the ventilating-pipe, as shown at $a$, for the purpose of preventing the siphoning of the traps; but it is impracticable to make these pipe-connections between the traps and the ventilating-pipe of the same size as the soil-pipe, and when smaller they are liable to fail of their purpose. A sudden discharge of water from a considerable height above would create a vacuum which the pipe $a$ could not instantly supply, and the result would be that the water would be drawn out of the trap, leaving that part of the house exposed to the various sewer-gases. To remedy this, and to provide against any possibility of siphoning the traps, I provide, in connection with the pipes $a$, pipes $b$, connecting the ventilating-pipe with the soil-pipe at points below the bend or discharge of the traps. These pipes afford instantly from the ventilating-pipe a supply of air to the soil-pipes at points where a vacuum occurring in the descent of a mass of water would tend to siphon the traps. These pipes $b$ also serve to ventilate the soil-pipe into the ventilating-pipe, and then both the soil-pipe and the traps are thoroughly ventilated. I extend the ventilating-pipe to the open air, as explained, and thereby I have a constant current of fresh air through this pipe quite independent of the air through this pipe quite independent of the soil-pipe, and any foul air forced by flushing will escape through the pipes and be taken up by the constant current in the ventilating-pipe.

To complete the system and prevent any foul air from being forced into the yard or area or upon the walk, I connect the soil-pipe inside the outer trap with the ventilating-pipe by means of a pipe, $b'$, so that any foul air forced down to that point will escape by pipe $b'$ and be carried off by the constant upward current in pipe A. The pipe connections or branches $b$ and $b'$ are of the same diameter or about the same diameter as the main pipes A and B. Thus there is a constant upward current, and the air may circulate constantly through the branches $a$ and $b$ and over the water as well as through the main pipes. The top of the ventilating-pipe is turned down, and this pipe is therefore always dry, and the air circulates more freely through a dry pipe than through a wet soil-pipe.

I claim—

In combination with a soil-pipe and the receptacles and traps connected therewith, a ventilating-pipe having its lower and upper ends opening to the air, the pipes $a$, connecting the traps to the ventilating-pipes, and the pipes $b$, connecting the soil-pipe and the ventilating-pipe, substantially as described.

In testimony whereof I have signed my name to this specification in the presence of two subscribing witnesses.

PAPHRO D. PIKE.

Witnesses:
J. B. THOMPSON,
F. L. MIDDLETON.